L. BRADLEY.
ELECTRIC CURRENT CONTROLLER
APPLICATION FILED MAY 28, 1909.

1,119,800.

Patented Dec. 8, 1914
5 SHEETS—SHEET 1

Fig. 1.

Witnesses:
David E. Hulfish
Wm. Berghahn.

Inventor:
Lynde Bradley
By McMeen & Miller
Attys.

L. BRADLEY.
ELECTRIC CURRENT CONTROLLER
APPLICATION FILED MAY 28, 1909.

1,119,800.

Patented Dec. 8, 1914.
5 SHEETS—SHEET 5.

Witnesses:

Inventor
Lynde Bradley.
By McMurren+Miller
Attys.

UNITED STATES PATENT OFFICE.

LYNDE BRADLEY, OF MUSKEGON, MICHIGAN, ASSIGNOR TO ALLEN-BRADLEY COMPANY, A CORPORATION OF WISCONSIN.

ELECTRIC-CURRENT CONTROLLER.

1,119,800.

Specification of Letters Patent.

Patented Dec. 8, 1914.

Application filed May 28, 1909. Serial No. 498,850.

*To all whom it may concern:*

Be it known that I, LYNDE BRADLEY, a citizen of the United States of America, and a resident of Muskegon, county of Muskegon, and State of Michigan, have invented a new and useful Improvement in Electric-Current Controllers, of which the following is a specification.

My invention pertains to electric current controllers of the type which comprises a combination of electric switches and variable resistances.

It relates more particularly to devices in which the progression of a control lever through a predetermined movement operates a switch to change the controlling circuits of a power using device, and of a resistor, and also to vary the resistance value of the resistor.

My present invention contemplates the employment of a resistance-varying device in which the variations of resistance are secured by placing a variable pressure upon the resistor proper. The resistance medium or resistor of such resistance-varying devices, I make preferably of specially treated carbon disks (as disclosed in an application filed by Harry L. Bradley and myself, jointly, Serial No. 467,352, filed December 14, 1908), but I do not limit myself to this form of resistor, as resistors of ordinary carbon such as are disclosed in my Patent 815,317, March 13, 1906, or of other materials, may be employed. Instead of the resistor being in the form of disks, I may employ other shapes, such as granular, spherical or other forms, in any of which cases I confine the resistor in a suitable manner in a retainer of form such as to make it offer a suitable path for the current to be varied and to hold it in readiness for the required compression.

My improved current controller comprises novel means for supporting and for varying the pressure upon the compressible resistor forming the variable-resistance part of a current controller, and novel electrical and mechanical features involved in the arrangement and adapted to assist in the functions of such means. One feature of such an arrangement involves the sustaining of the resistor directly upon the controlling lever. Another feature is the arrangement of the various parts in relation to each other whereby the same motion of the controlling lever which accomplishes the compression or decompression of the resistor, also will accomplish the desired circuit changes and other functions of the controller.

Particularly I provide for the ventilation of the radiating surfaces which are required to dissipate the heat of the resistor. The arrangement for accomplishing this involves the mounting of the resistor container upon the operating arm, by the movement of which arm the resistor is compressed or decompressed and by the movement of which also the circuit changes are accomplished. Under the movement of this arm, therefore, the resistor with its radiating surfaces is moved back and forth through the air, thus aiding in the rapid dispersion of the heat generated within the resistor.

Other features of my improved current controllers are high insulation between the current-carrying parts of the controller and the mounting base or frame of the device, and improved details of the circuit changing switch. I particularly guard against the flow of electric current through highly heated insulation members. Besides a novel arrangement of the circuit changing switch parts I provide improvements in the brush devices.

Figs. 3, 4, 5 and 6 show circuit connections of my electric current controller when used as a motor controller, showing the motor and the electric current controller in different conditions of service. Figs. 7, 8, 9 and 10 show details of my improved brush and brush holder for the circuit changing switch. Fig. 11 shows section of Fig. 2 on line 7—7. Fig. 12 shows a detail, and Fig. 13 a modification thereof.

Figure 1:
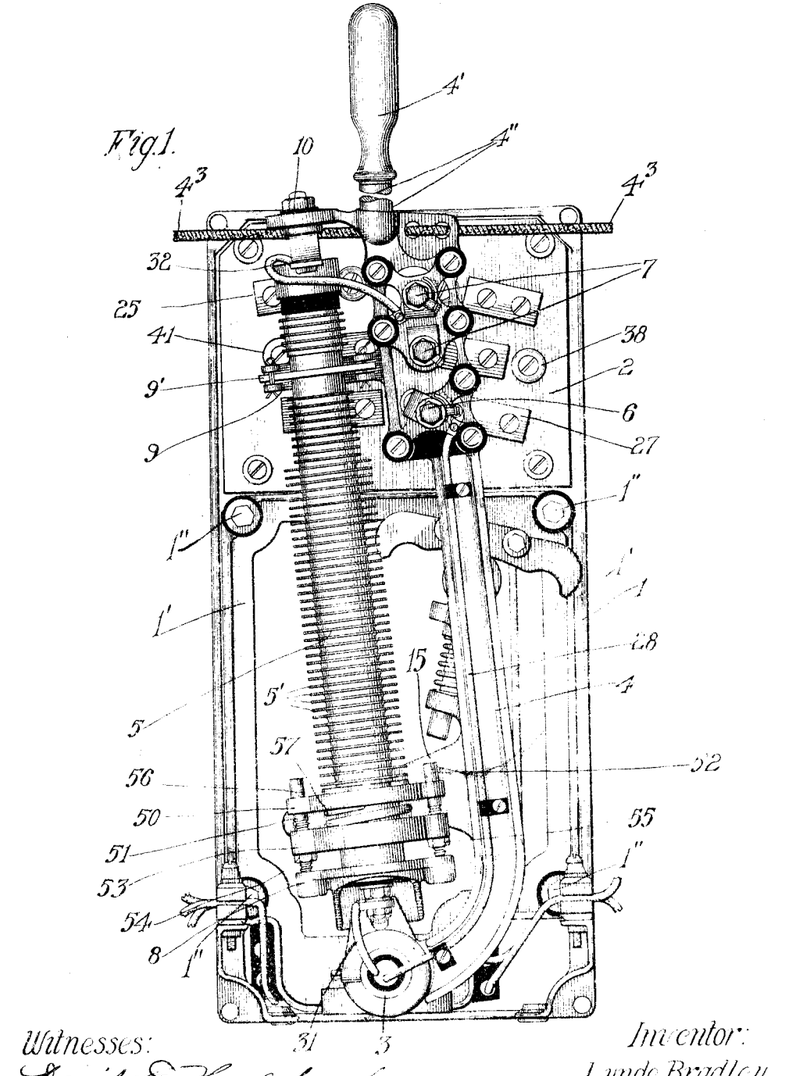
Figure 1 shows front view of an electric current controller constructed in accordance with the principles of my invention.

Referring to Fig. 1, a frame 1 supports an insulating slab 2 upon which divers conducting contact pieces for the switching circuits are arranged. Upon the frame 1 is mounted a subframe 1', by four bolts, 1'', 1'', 1'', 1'', having insulating washers and bushings. Upon subframe 1' is tubular shaft 3, lined with insulation 3'' and fixed by set screw 3⁵, which shaft supports pivotally the operating lever 4 carrying a resistance unit 5.

Tubular sleeve 4⁴ is an integral part of arm 4. Set collar 3³ set by screw 3⁴ holds 4⁴ on 3 and is of cup shape to prevent the lubricating oil between 4⁴ and 3 from working out readily to the end of tube 3 and to the contained conductors. The object of thus mounting the operating lever 4 and its supported resistance unit 5 upon an insulated subframe is to secure an insulation separation of the main frame from the resistance unit so located that the insulation will not be subjected to great heat. Most insulators become partial conductors as their temperature rises, and for this reason the insulation of the resistance unit 5 might at times permit some flow of current to the main frame 1 were the main frame to become grounded and were the path for such current not interrupted by the provision of the auxiliary insulation surrounding the bolts 1'' supporting the subframe 1', the auxiliary insulation being remote from the source of heat.

The operating lever 4 is controlled by rope 4⁸ or by an operating handle 4' which is affixed to the end of a shaft 4'' broken for convenience in the drawing, but which may be of any length desired to offer sufficient leverage to operate the device to apply a sufficient pressure upon the compressible resistance unit 5. The operating arm 4 carries single brush 6 and double brush 7 for controlling the switching circuits of the current controller, and in addition this operating arm carries the resistance unit 5. The operating arm 4 carries upon itself the variable resistance device 5, and this device, therefore partakes of the lateral movement of the arm; its relation with the arm and its associated parts being such that as the arm is moved the resistance device is also subjected to such changes in pressure as will produce the required changes in its resistance. The resistance unit 5 is often forced to carry heavy currents, and, as a consequence, great heat is likely to be generated therein. By mounting this unit upon the operating lever I attain the advantage of greatly assisting in the dissipation of this heat by the consequent movement of this unit through the air; this dissipation of heat also being assisted by the radiating fins or flanges 5' which give increased radiating surface to the tube containing the variable resistance medium. Such controllers are largely used in mills or factories under conditions where dust is likely to accumulate upon them. An additional advantage, which accrues from the mounting of the resistor unit directly upon the arm, is that at every operation of the arm there is such a movement and jarring of the unit as to tend to shake off the dust and thus prevent such an accumulation as would interfere with its heat-radiating properties.

A further advantage, secured by mounting the resistor in front of the controller panel rather than on its rear, is in the matter of enforced prominence, resulting in its greater accessibility and in a decrease in fire hazard in cases where controllers are mounted in proximity to an inflammable wall. Furthermore, this position assures a free circulation of air about the unit, which is not so readily obtainable where the resistance units are mounted back of the controller panel close to a wall, and particularly where they are so mounted close to the floor line.

Figures 7, 8, 9, 10:
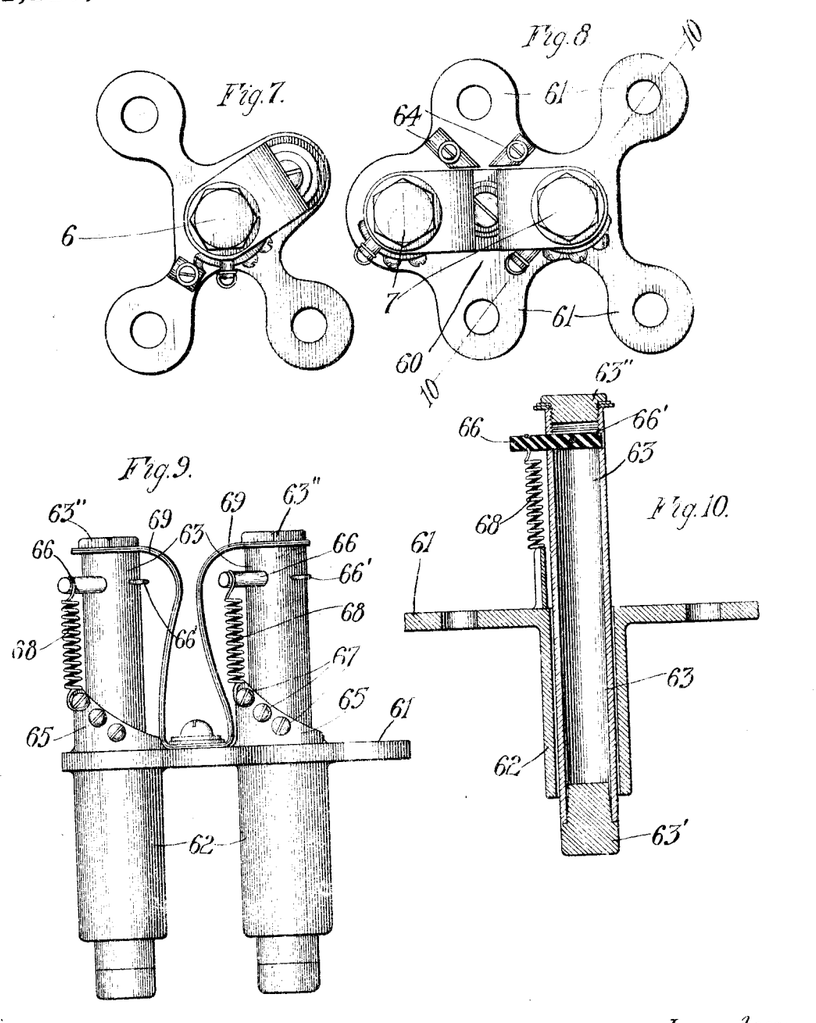
Fig. 7 shows view of the single brush, looking at its end.
Fig. 8 shows a view of the double brush from the same direction.
Fig. 9 shows a side view of the device of Fig. 8.
Fig. 10 shows a sectional view of same on the line 10 of Fig. 8.

The controller arm 4 carries upon it parts of the switching device for changing the circuits of the resistor and of the controlled circuit-using device. Brushes 6 and 7 are contact members of the circuit changing switch, and conductors 28 and 32 leading to those parts also are carried by the arm 4. An improvement in the circuit-controlling switch is found in the construction of brush holders designed to be carried by the arm 4. The brush holders are two in number, the upper one carrying double brush 7 and the lower one carrying single brush 6. These brush holders and their brushes are shown in Figs. 7, 8, 9 and 10. Each brush holder consists substantially of a single base structural part holding the brushes movably in proper position, the base part carrying also terminal binding posts for the leading-in wires, and a conducting connection being made to the brushes by a flexible conductor. The brush base part 60 is illustrated in Figs. 8, 9 and 10, and comprises a flat platform-like structure having four lugs 61 for four mounting screws. Projecting downwardly from the platform portion of the base are tubular parts 62 which hold slidably the brushes 63. Projecting upwardly from the platform portion of the base are the lugs 64, provided with set screws to receive leading-in conductors, and the lugs 65, provided with screws 67, for holding the spring 68. The brushes 63 are of brass tube, copper tipped at 63'. A binding screw 63'' is adapted to clamp a flexible strap conductor 69 connecting also to the body or base of the brush holder and therefore to the binding post for the leading-in conductors.

A fiber pin 66 is inserted transversely in the brush and is secured by drive pin 66'. Spring 68 is attached at one end to the fiber pin and at the other end to a selected one of the screws 67 in the lug 65. These screws are placed at different heights and the tension of the spring 68 may be determined by the selection exercised among the screws 67 with reference to their height, thus determining the length to which the spring 68 will be stretched. The screws 67, in view of their varying heights, also provide for taking up the wear of the brush tips 63'. As the brush wears shorter, the spring 68 is advanced to the next lower screw. The entire brush holder is insulated from the arm 4 by insulating washers and bushings at the holes in lugs 61. The two brushes 63 of the device of Figs. 8, 9 and 10 are electrically connected and are designated as double brush 7. The device of Fig. 7, carrying the single brush 6, is similar in all essential respects, but is modified in design to carry out one brush. These brushes are likely to carry very large currents, particularly when the circuit through a motor is first closed and, while the spring 68 is heavily shunted not only by the band conductors 69 but also by contact between parts 63 and 62, yet a current sufficient to heat the spring 68 might flow, thus damaging its temper. To avoid this possibility I make the pin 66 of insulating material. The brush holders are mounted in such position that the shaft 63 is substantially perpendicular to the plane of the faces of the fixed conducting elements of the switch, and the spring 68 urges the brush toward the fixed elements of the switch, effecting contact between 63' and such elements as are determined by the position of the operating arm 4.

The resistance unit 5 is a complete resistance device and radiating element, which reduces its resistance when subjected to pressure upon its ends.

Figure 2:
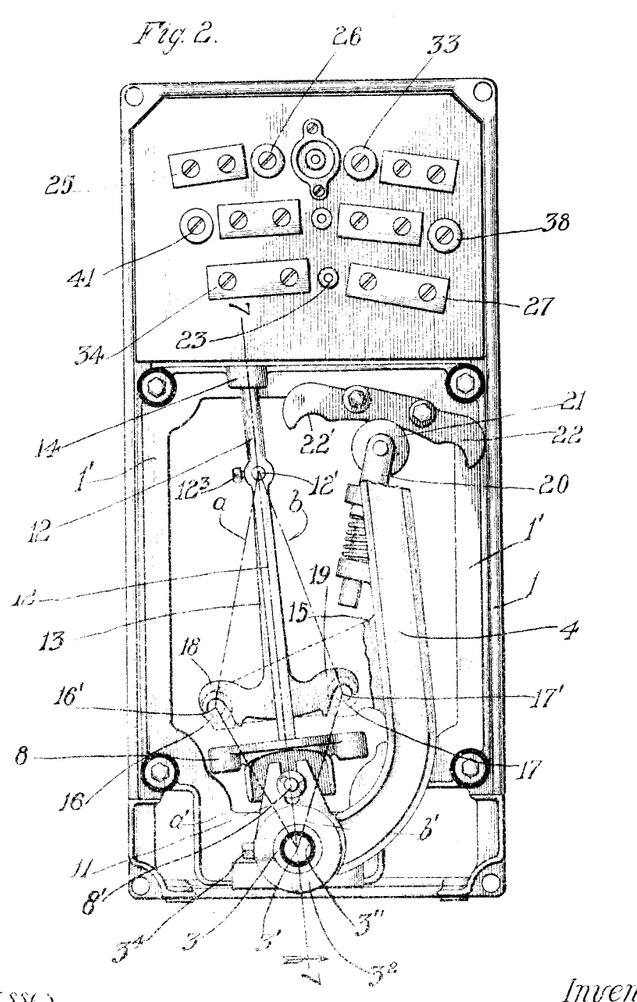
Fig. 2 shows a similar view with divers parts removed.

Means for compressing the resistance unit 5 when the lever 4 is moved in either direction from its central position is provided as follows: The lower end of the resistance unit 5 is supported by the carriage 8. The upper end is held slidably in the yoke 9, in which it is held by the locking bar 9'. The upper terminal of the resistor impinges upon abutment 10. Yoke 9 and abutment 10 are rigid parts upon the operating arm 4, preferably being all one casting, while carriage 8 is mounted slidably in the slot of yoke 11, so that carriage 8 may move toward abutment 10 and thus compress resistance unit 5 between the two parts 8 and 10. Carriage 8 is pivotally attached by shaft 8' to the cast frame 12, which is in the form of two rods, one behind the other as viewed in Fig. 2, the rods connected at the bottom and at 12''. By shaft 12', set by screw 12², the frame 12 is pivoted to rod 13. Frame 12 passes slidably through the guide 14 upon the subframe 1'. Upon the arm 4 is a transverse arm 15, which in Fig. 2 is shown broken away to reveal the mechanism at the back thereof. The arm 15 carries two studs 16 and 17 which are engaged by hook ended transverse arms 18 and 19 upon the rod 13. A toggle mechanism now is discernible having its extreme pivots at 12' and the axis 3' of the pivoted arm 4, and having its intermediate pivot at 16' or 17' depending upon whether the operating arm 4 moves to right or left, respectively. The broken lines $a\ a'$ and $b\ b'$ are construction lines indicating the mechanical elements of the toggle movements just described. When the operating lever 4 is moved to the right, the stud 16 moves in an arc about point 3' and lifts the yoke 18 and the rod 13, which acting through pivot 12' lifts sliding frame 12 and carriage 8, compressing the resistance unit 5. This compression will continue and increase as the operating arm 4 is moved farther and farther, and it may be noted also that the ratio of power conversion becomes one of greater inequality as the pressure upon the resistance unit 5 becomes greater. At the beginning of the movement of the operating arm 4 to the right, hook 19 is lifted from the stud 17. Upon the movement of the operating arm 4 to the left, a similar mechanical action occurs involving the stud 17 and hook arm 19, and lifting the hook 18 from stud 16.

Figures 11, 12, 13:
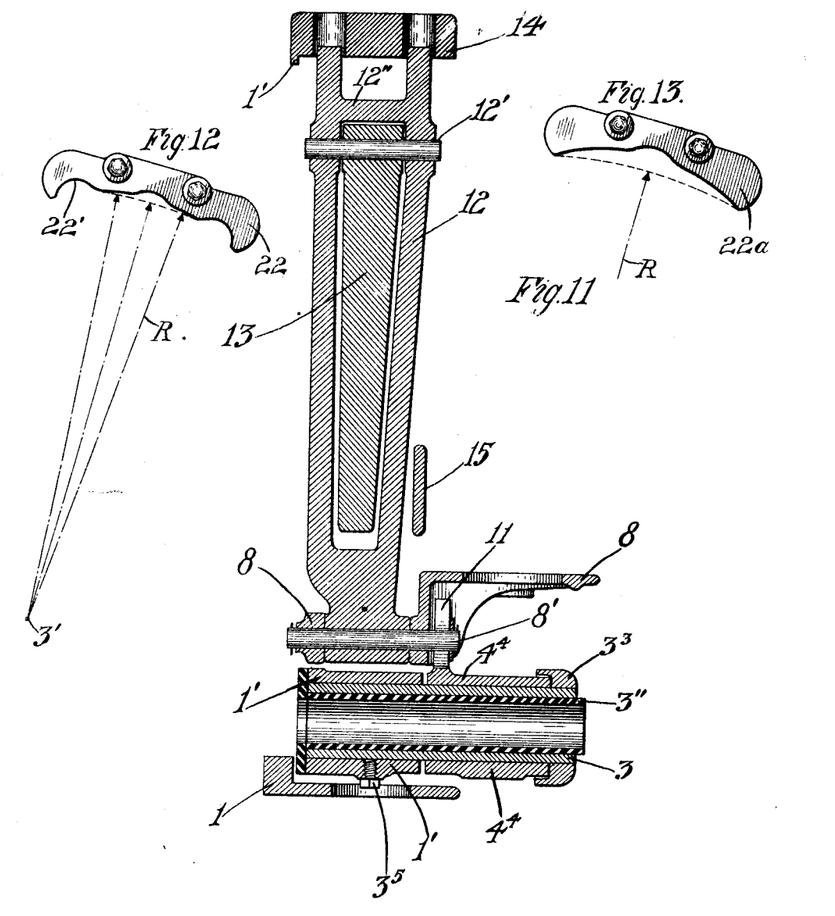

The operating arm 4 carries spring pressed plunger 20 having a roller 21 bearing upon track 22. Track 22 is provided with three recesses or notches, one of which is indicated at 22' the notches being located at the center and at the two ends of the track respectively. This device holds the operating arm 4 in place when at its neutral or middle position or when at either of its two extreme positions. By giving the tread of the track 22 a curve of lesser radius than the radius R from 3', see Fig. 12, the spring-pressed roller 21 is caused to urge the arm 4 toward its middle or neutral position. At times it is desirable to modify the end notches. Such a modification is shown at 22ª in Fig. 13. The function of the roller and track when thus modified is always to return the arm 4 to its middle position whenever the operating handle or ropes are released by the operator.

In order that the conductors 28, 31 and 39' (see Fig. 6) which lead to terminals carried by the operating arm 4 may be subjected to a minimum amount of bending, I mount the arm 4 upon the insulation-lined tubular shaft 3 and bring the conductors 31 and 28 (and 39' when needed) through said shaft, the location of the conductors thus approximating the axis of movement of the operating lever 4. By this means the flexible conductors are subjected to little bending other than a twist through a very small angle.

The resistance unit 5 is carried by the plate 50. Threaded studs 51, 52 engage carriage 8 rotatably and plates 50 and 53 are mounted upon the studs, the coiled compression spring 57 being placed between them. Plate 53 is threaded upon rotatable studs 51 and 52 and is held locked by nuts 54 and 55. Thus the pressure of carriage 8 is transmitted through studs 51 and 52 to plate 53 thence through spring 57 to the loosely sliding plate 50 which carries the resistance unit 5 directly by engagement with the flange 56 which is rigidly mounted upon the resistance unit 5. The resistance unit 5 projects through plates 50 and 53 and also through carriage 8 to secure and maintain the alinement of all parts. The adjustment afforded by studs 51 and 52 provides for any variation in the length of the resistance unit 5; it provides also for an adjustment of the distance between 50 and 10 whereby the beginning of pressure upon the resistance unit 5 may be caused to occur sooner or later in the movement of the arm 4 from its central position; it provides also for regulating to any predetermined degree the maximum pressure and therefore the minimum resistance which may be attained for the resistance unit 5 when the lever 4 is in either of its extreme positions.

Figure 3:
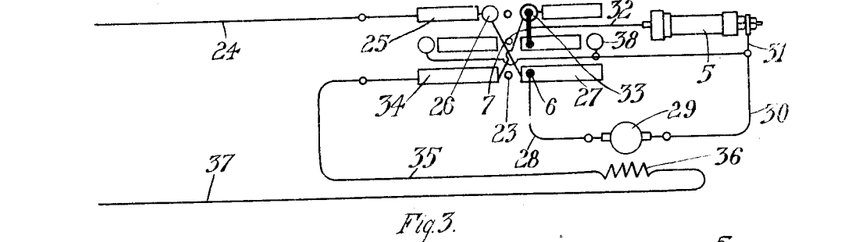
Fig. 3 shows the circuit connections when a series motor is being started.
Figure 4:
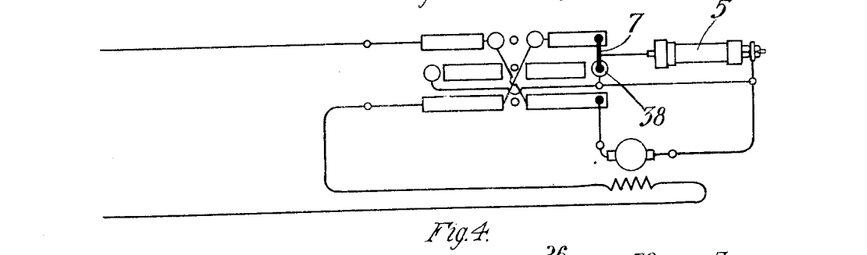
Fig. 4 shows circuit connections when a series motor is at full speed.

The circuits proposed for the specific electric current controller herein illustrated when used to control a series motor are shown in Figs. 3, 4, 5 and 6, and may be understood from them. When the operating arm 4 is in its middle position, the brushes rest upon the three isolated central points in a vertical line at 23 and all circuits are open. At the first movement of the operating arm 4 to the right the circuits of Fig. 3 are obtained. Current assumed to be received from conductor 24 passes through switch contacts 25, 26, and 27, brush 6, conductor 28, armature 29, conductor 30, conductor 31, resistor 5, conductor 32, brush 7, switch elements 33 and 34, conductor 35 and field winding 36 to return conductor 37. As the movement of the operating lever 4 continues toward the right, the circuits described are not changed, but the resistance of the resistance unit 5 is decreased continuously until the operating lever reaches its extreme position, at which time the brushes 6 and 7 are at the extreme right and brush 7 makes contact with switch element 38. By this contact the resistance unit 5 is shunted and the full potential of the power mains is given to the motor. This condition is illustrated in Fig. 4.

Figure 5:
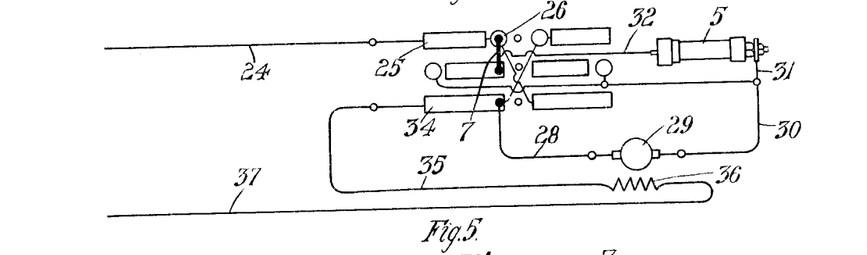
Fig. 5 shows circuit connections when a series motor is being started in reverse direction.

In Fig. 5 the condition of starting in reverse direction is shown. In the circuit of this figure, current flows through 24, 25, 26, 7, 32, 5, 31, 30, 29, 28, 34, 35, 36, 37, thus passing through the armature in the opposite direction and through the field in the same direction, reversing the direction of the rotation of the armature.

Figure 6:
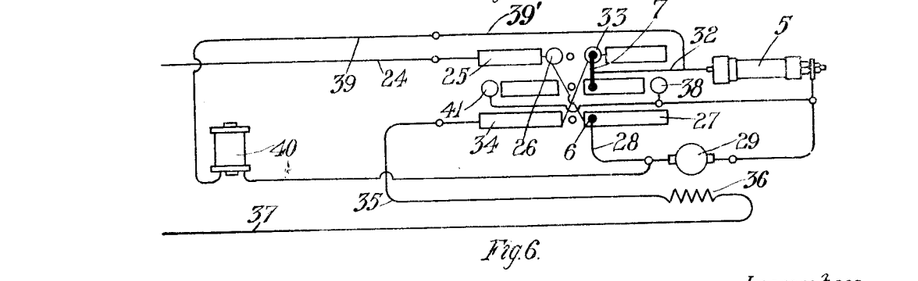
Fig. 6 shows circuit connections with a series motor having an electric brake magnet connected in shunt.

In Fig. 6 are shown the circuits suitable for the device of Figs. 1 and 2, when used as a motor controller for a series motor having an electric brake magnet 40 connected "in shunt". In this arrangement of circuits, the circuits are open when the controller lever 4 is in its middle position, while in any other position of the controlling lever the armature is in series with the resistance unit, the brake magnet is in shunt of the armature-and-resistance combination, and the field is in series with all. When the arm 4 is in either of its extreme positions the resistance unit 5 is short-circuited. The brake magnet 40 therefore is subjected at all times to the drop of potential across the armature 29 and resistance unit 5, this drop of potential being sufficient to operate the magnet to remove the brake at all times. Circuit may be traced through 37, 36, 35, 34, 33, 7, 32, 5, 29, (5 and 29 being shunted by 40,) 28, 6, 27, 26, 25, 24. When starting in reverse direction, the circuit is through 37, 36, 35, 34, 6, 28, 29, 5, (29 and 5 being shunted by 40,) 32, 7, 26, 25, 24.

Having thus described my invention what I claim as new, and desire to secure by United States Letters Patent is:

1. In an electric current controller, the combination of a resistor; a switch for bringing said resistor into and out of an electric circuit; and an operating lever for said switch, said resistor being mounted upon said operating lever and movable with said lever.

2. In an electric current controller, an operating lever; an electric switch, the brushes forming a part of said switch being carried upon said lever; conductors connecting to said brushes; and a tubular shaft upon which said operating lever is mounted and through which said conductors pass.

3. In an electric current controller, the combination of a resistor whose resistance is variable by pressure; an operating lever upon which said resistor is mounted; an abutment upon said lever and engaging one end of said resistor; and a movable member upon said lever and engaging the other end of said resistor.

4. In an electric current controller, the combination of an operating lever; a resistor whose resistance is variable by pressure, said resistor being mounted upon and carried by said lever; means for placing a variable pressure upon one end of said resistor and means upon said lever for retaining the other end of said resistor, said retaining means comprising a yoke through which said resistor passes slidably and a fixed abutment against which said resistor may be pressed.

5. In an electric current controller, the combination of a lever, a resistor mounted upon said lever and movable therewith in such manner as to assist in the ventilation of said resistor.

6. In an electric current controller, the combination of a compressible variable resistor; compression means for said resistor; said compression means comprising an operating lever and other levers, and said resistor being mounted upon said operating lever and movable therewith.

7. In an electric current controller, the combination of a compressible variable resistor; a moving lever having a fixed abutment and guide adjacent to said fixed abutment and a movable carriage positioned opposite said abutment and guide, said resistor passing through said guide and being retained between the said carriage and said abutment; and means for moving said carriage toward and from said abutment when said lever is moved.

8. In an electric current controller, a compressible variable resistor; an abutment therefor; a carriage therefor movable toward and from said abutment; a pair of plates interposed between said carriage and said resistor, one of said plates engaging said carriage adjustably; and a spring between said plates whereby pressure exerted by said carriage upon said resistor is transmitted only through said spring.

9. In an electric current controller, a compressible variable resistor; an abutment therefor; a carriage therefor movable toward and from said abutment; a pair of plates interposed between said carriage and said resistor, one of said plates engaging said carriage adjustably; and a spring between said plates whereby pressure exerted by said carriage upon said resistor is transmitted only through said spring, said resistor being tubular in form and said plates and carriage being perforated and said tubular resistor passing through said plates and carriage whereby the alinement of the parts is assisted and maintained.

10. In an electric current controller, a main frame; a subframe; insulating mountings for said subframe and sustaining it upon said main frame; and a heat radiating element upon said subframe, said insulating mountings being situated remotely from said radiating element.

11. In an electric current controller, a main frame; a subframe; and a resistor; said resistor being doubly insulated from said main frame first by insulation between said resistor and said subframe, and second by insulation between said subframe and said main frame.

12. In an electric current controller, a main frame; a subframe; a controlling lever mounted upon said subframe; and a resistor mounted upon said lever; said resistor being doubly insulated from said main frame first by insulation between said resistor and said subframe, and second by insulation between said subframe and said main frame.

13. In an electric current controller, a controlling lever; a compressible resistor mounted upon said lever; a guide yoke and a fixed abutment for one end of said resistor and made integrally with the body of said lever; and means movable upon said lever for supporting the other end of said resistor.

14. In an electric current controller, a controlling lever; a compressible resistor mounted upon said lever; a guide yoke and a fixed abutment for one end of said resistor and made integrally with the body of said lever; means movable upon said lever for supporting the other end of said resistor, a guide yoke upon said lever for said movable means, said guide yoke being also formed integrally with the body of said lever.

15. In an electric current controller, a combination of an operating lever; a resistor whose resistance is variable by pressure, said resistor being mounted upon and carried by said lever; means for placing a variable pressure upon one end of said resistor and means upon said lever for retaining the other end of said resistor, said retaining means comprising a yoke through which said resistor passes slidably and a fixed abutment against which said resistor may be pressed, said yoke, fixed abutment and lever being formed integrally.

16. In an electric current controller, a controlling lever; a compressible resistance unit thereupon; fixed means upon said lever for holding one end of said compressible resistance unit; a movable carriage upon said lever for holding the other end of said resistance unit; and a toggle for moving said movable means to compress said resistance unit.

17. In an electric current controller, a controlling lever; a compressible resistance unit thereupon; fixed means upon said lever for holding one end of said compressible resistance unit; a movable carriage upon said lever for holding the other end of said resistance unit; and a toggle for moving said movable means to compress said resistance unit, said lever forming a structural member of said toggle.

18. In an electric current controller, a controlling lever; a compressible resistance unit thereupon; fixed means upon said lever for holding one end of said compressible resistance unit; a movable carriage upon said lever for holding the other end of said resistance unit; and a toggle for moving said movable means to compress said resistance unit, said lever forming a structural member of said toggle and said toggle being operated by said lever.

19. In an electric current controller, an operating arm; a toggle of which said operating arm in part forms a structural member; a compressible resistance unit carried upon said arm; and means for varying the pressure upon said resistance unit by the action of said toggle when said arm is moved.

20. In an electric current controller, a controlling lever; a compressible resistance unit thereupon; fixed means upon said lever for holding one end of said compressible resistance unit; a movable carriage upon said lever for holding the other end of said resistance unit; and means for adjusting the normal distance between said fixed means and said movable carriage.

21. In an electric current controller, a controlling lever; a compressible resistance unit thereupon; fixed means upon said lever for holding one end of said compressible resistance unit; a movable carriage upon said lever for holding the other end of said resistance unit; and means for adjusting the normal distance between said fixed means and said movable carriage, said adjusting means comprising screw studs engaging said carriage and carrying parts which in turn support the resistance unit.

22. In an electric current controller, a movable pivoted arm; conductor terminal devices upon said arm; a tubular shaft upon which said arm is pivoted; an insulating lining for said shaft; and conductors passing through said shaft and through said insulating lining and connecting at one end to the said terminals.

23. In an electric current controller, a fixed tubular shaft; electrical conductors passing through said tubular shaft; a movable part sleeved upon said shaft; and a collar holding said part upon said shaft, said collar being concave on the face near said movable part.

24. In an electric current controller, a fixed tubular shaft, electrical conductors passing through said tubular shaft; a movable part sleeved upon said shaft; and a cup-shaped element being at the same time a restraining element to hold said movable part upon said shaft and an oil shield for said conductors.

25. In an electric current controller, a frame; a tubular shaft; a movable part, said movable part being supported upon said frame pivotally by means of said tubular shaft; electrical conductors passing through said tubular shaft; and a cup-shaped element forming at the same time an oil shield for said conductors and a means for maintaining said other parts in their relative positions as described.

26. In an electric current controller, a frame work structure; a controller arm journaled upon said structure; a track member attached to said structure; a roller upon said arm and pressing upon said track; a spring carried upon said arm and pressing said roller against said track, said track being so conformed that the spring of said roller is compressed when said operating arm is moved from its normal position of rest; pulleys attached to said frame work structure; and a rope attached to said arm and passing through said pulleys whereby, by power applied through said rope, said arm may be moved from its position of rest, and said spring compressed, said spring operating subsequently to restore said arm to its position of rest when the rope is released.

27. In an electric current controller, a frame work structure; a controller arm journaled upon said structure; a resistor mounted upon said controller arm and carried by said arm and ventilated to dissipate heat by the movement of said arm; a track member attached to said structure; a roller upon said arm and pressing upon said track; a spring carried upon said arm and pressing said roller against said track, said track being so connected that the spring of said roller is compressed when said operating arm is moved from its normal position of rest; pulleys attached to said frame work structure; and a rope attached to said arm and passing through said pulleys whereby, by power applied through said rope, said arm may be moved from its position of rest, and said spring compressed, said spring operating subsequently to restore said arm to its position of rest when the rope is released.

28. In an electric current controller, a tubular shaft; a movable oil lubricated part journaled upon said shaft; electrical conductors passing through said shaft; and an oil shield for said conductors.

29. In an electric current controller, a tubular shaft; a movable oil-lubricated part journaled upon said shaft; electric conductors passing through said shaft; and an oil shield for said conductors, and being at the same time means for holding said movable part upon said shaft.

30. In an electric current controller, a main frame; a sub-frame; insulating mountings for said sub-frame and sustaining it upon said main frame; a compressible resistance medium and compression means supported upon said sub-frame, said main frame carrying means of attachment to wall, floor, or other support.

31. In an electric current controller, a variable resistance; compression means comprising an operating lever and other levers, and said resistance being mounted upon said operating lever and movable therewith.

Signed by me at Chicago, county of Cook, and State of Illinois, in the presence of two witnesses.

LYNDE BRADLEY.

Witnesses:
 DAVID S. HULFISH,
 HARRIET L. SMITH.